United States Patent
Atkins (10) Patent No.: US 9,955,145 B2
(45) Date of Patent: Apr. 24, 2018

(54) METHOD AND APPARATUS FOR FLICKER REDUCTION AND CONTRAST ENHANCEMENT IN 3D DISPLAYS

(75) Inventor: Robin Atkins, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 979 days.

(21) Appl. No.: 14/110,389

(22) PCT Filed: Apr. 9, 2012

(86) PCT No.: PCT/US2012/032756
§ 371 (c)(1),
(2), (4) Date: Oct. 7, 2013

(87) PCT Pub. No.: WO2012/139108
PCT Pub. Date: Oct. 11, 2012

(65) Prior Publication Data
US 2014/0028815 A1    Jan. 30, 2014

Related U.S. Application Data

(60) Provisional application No. 61/473,686, filed on Apr. 8, 2011.

(51) Int. Cl.
*H04N 13/04* (2006.01)
*H04N 13/00* (2018.01)
(Continued)

(52) U.S. Cl.
CPC ..... *H04N 13/0434* (2013.01); *G02B 27/2264* (2013.01); *G02B 27/26* (2013.01);
(Continued)

(58) Field of Classification Search
CPC .................................................. H04N 13/0434
See application file for complete search history.

(56) References Cited

U.S. PATENT DOCUMENTS

| 5,548,427 A | * | 8/1996 | May | G02B 5/32 349/117 |
| 5,629,798 A | * | 5/1997 | Gaudreau | G02B 27/26 348/58 |

(Continued)

FOREIGN PATENT DOCUMENTS

| DE | 19510671 | 10/1996 | |
| DE | 19510671 A1 | * 10/1996 | G02B 27/26 |

(Continued)

OTHER PUBLICATIONS

Patent DE 19510671A1—Apparatus for 3-D image representation (English Machine Translation).*

(Continued)

*Primary Examiner* — Christopher S Kelley
*Assistant Examiner* — Asmamaw G Tarko (57) ABSTRACT

A 3D projector system includes a locally modulated polarizer mounted in front of a projector. The polarizer is controllable to produce different polarization states for local regions of the projector images. Combinations of polarizer states and projector images can be used to produce left and right images which have reduced intensity differences between subsequent frames. This may reduce flickering and viewer eye fatigue. This may also reduce unwanted crosstalk between left and right eye viewpoints and increase image contrast and dynamic range.

10 Claims, 9 Drawing Sheets

(51) Int. Cl.
*G02B 27/22* (2018.01)
*G02B 27/26* (2006.01)

(52) U.S. Cl.
CPC ..... *H04N 13/0033* (2013.01); *H04N 13/0438* (2013.01); *H04N 13/0459* (2013.01); *H04N 13/0431* (2013.01)

(56) References Cited

U.S. PATENT DOCUMENTS

| | | | |
|---|---|---|---|
| 6,111,598 A | 8/2000 | Faris | |
| 7,190,518 B1 | 3/2007 | Kleinberger | |
| 7,646,537 B2* | 1/2010 | Shestak | G02B 27/2214 348/57 |
| 7,705,935 B2* | 4/2010 | Gaudreau | G02B 27/26 349/1 |
| 8,952,957 B2* | 2/2015 | Ko | G02B 27/2264 345/4 |
| 2004/0233275 A1* | 11/2004 | Tomita | G02B 27/0093 348/51 |
| 2005/0105610 A1 | 5/2005 | Sung | |
| 2006/0203339 A1 | 9/2006 | Kleinberger | |
| 2008/0303962 A1 | 12/2008 | Tomita | |
| 2009/0040402 A1 | 2/2009 | Tomita | |
| 2010/0007716 A1* | 1/2010 | Lee | H04N 13/0434 348/43 |
| 2010/0110166 A1* | 5/2010 | Chang | G03B 35/16 348/57 |
| 2010/0188488 A1* | 7/2010 | Birnbaum | G09G 3/001 348/53 |
| 2011/0063421 A1* | 3/2011 | Kubota | H04N 13/0003 348/52 |
| 2011/0267442 A1* | 11/2011 | Imai | G02B 27/2264 348/56 |
| 2012/0147280 A1* | 6/2012 | Osterman | G02B 27/26 349/9 |
| 2013/0021458 A1* | 1/2013 | Inoue | G02B 27/0093 348/56 |

FOREIGN PATENT DOCUMENTS

| | | |
|---|---|---|
| JP | 9-113862 | 5/1997 |
| JP | 2006-301549 | 11/2006 |

OTHER PUBLICATIONS

Gaudreau, J. E. et al. "Innovative Stereoscopic Display Using Variable Polarized Angle" Proc. of SPIE-IS&T Electronic Imaging, SPIE vol. 6055, Dec. 31, 2006.

* cited by examiner

FIG. 1

PRIOR ART

FIG. 2

PRIOR ART

METHOD AND APPARATUS FOR FLICKER REDUCTION AND CONTRAST ENHANCEMENT IN 3D DISPLAYS

CROSS-REFERENCE TO RELATED APPLICATIONS

This application claims priority to U.S. Provisional Patent Application No. 61/473,686 filed 8 Apr. 2011, which is incorporated herein by reference in its entirety.

TECHNICAL FIELD

This invention relates to three dimensional (3D) displays. In particular, this invention relates to 3D displays operable to sequentially display different images to a viewer's left and right eyes.

BACKGROUND OF THE INVENTION

A 3D visual effect may be created by a projector system by operating the projector to deliver left and right images representing different viewpoints to a viewer (observer) who is wearing special 3D viewing eyeglasses. For example, the viewer may wear polarized eyeglasses having polarizing filters (e.g. linearly polarized eyeglasses or circularly polarized eyeglasses). In such case the left and right images are each polarized so that they can be seen by the intended eye but not the other eye when wearing the polarized eyeglasses. In other display technologies, the user may wear spectral filtration eyeglasses to view different left and right images. In such case the projector is operated to provide spectrally filtered light to the viewer so that the left eye is presented with light in a first set of spectral bands (providing a left image) and the right eye is presented with light in a complementary, second set of spectral bands (providing a right image). In each case the human visual system of the viewer combines and interprets the left and right images to perceive a single 3D image having the illusion of depth.

Figure 1:
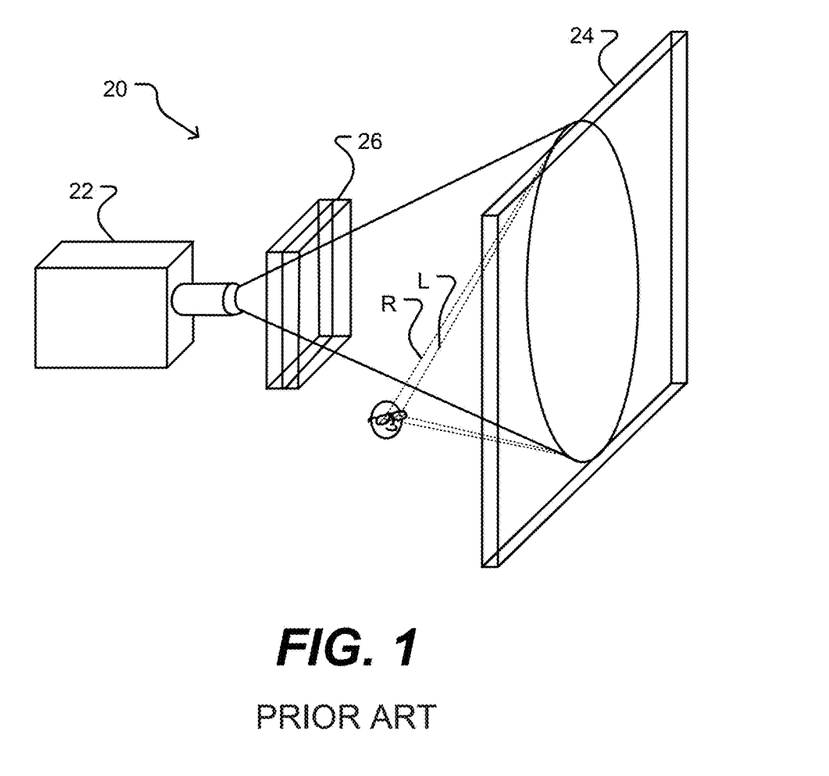
FIG. 1 shows a 3D front-view projector system.

Some 3D projector systems use a globally controlled polarizer mounted in front of a projector. For example, FIG. 1 shows a front-view projector system 20 having a projector 22 and a reflective screen 24 which reflects the light from projector 22 toward a viewing area in front of screen 24. A polarizer 26 is positioned in the light path between projector 22 and screen 24. Polarizer 26 is controllable to alternate between two opposite polarization states in synchronization with the display of left and right images L, R by the projector. Other 3D projector systems may use an optical element to modulate the polarization of light emitted from a projector so that left and right images are alternately displayed to a viewer.

In 3D projector systems such as those described above, a design objective is to minimize crosstalk between left and right channels. Crosstalk occurs if one eye sees some residue of the image intended for the other eye. Typically, to minimize crosstalk for 3D projector systems, left and right images are alternately displayed such that the entire screen is made to appear and disappear to each eye of the viewer during each cycle. When a left image is presented to the left eye, a blank screen is presented to the right eye, and vice versa. Flickering and viewer eye fatigue may result if the refresh rate to each eye is below a flicker fusion threshold. 3D viewing is more prone to flickering than 2D viewing because the 3D refresh rate is half of the 2D refresh rate. For example, if a cinema projector is capable of displaying images at a maximum frame rate of 48 fps, then for 3D viewing the frame rate is 24 fps for each eye, which may be below the flicker fusion threshold. The flicker fusion threshold is variable from person to person and also depends on factors such as amount of modulation, intensity, image size (field of view) and brightness.

Figure 2:
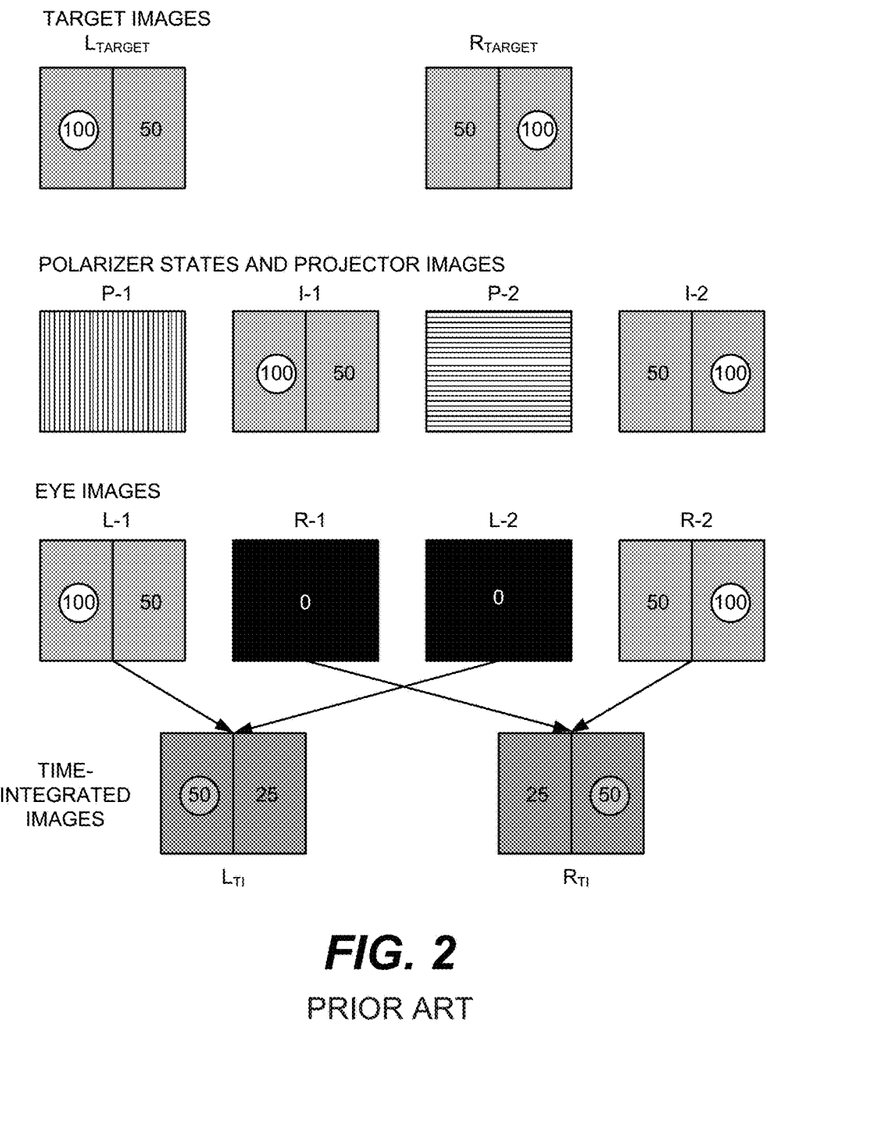
FIG. 2 shows polarizer states and images for a globally controlled (full frame) polarizer.

FIG. 2 shows the use of a polarizer switching between opposite left and right polarization states P1, P2 for two projector subframe images I1, I2, respectively, to generate different images to the left and right eyes of the viewer. The numbers within each image represent the light intensity. In the illustrated example, the vertical polarizer state P1 directs all the light from image I1 toward the left eye while blocking all light to the right eye. The horizontal polarizer state P2 directs all the light from image I2 toward the right eye while blocking all light to the left eye. The resulting subframe images shown to each of the left and right eyes are L1, R1 for the first subframe and L2, R2 for the second subframe. The human visual system of the viewer combines the light from the two subsequent frames for each eye so that the viewer sees time-integrated left and right eye images LTI, RTI.

As illustrated by FIG. 2, there is some reduction in the image intensity of time-integrated images LTI, RTI, from target images LTARGET, RTARGET. Also, as can be appreciated by comparing subframe images L1 to L2, and R1 to R2, the large differences in image intensity between subsequent frames for each eye may cause flicker and viewer eye fatigue.

Patent literature describing technology in the general field of this invention includes:

US20090040402 "Liquid crystal projector and control method for liquid crystal projector" (SONY CORP; 12 Feb. 2009);

U.S. Pat. No. 7,190,518 "Systems for and methods of three dimensional viewing" (3ALITY INC; 13 Mar. 2007);

JP2006301549 "Display method and display device" (EBARA J; Nov. 2, 2006);

US20050105610 "Temporal smoothing apparatus and method for synthesizing intermediate image" (SAMSUNG ELECTRONICS CO LTD; 19 May 2005);

US20060203339 "Systems for three-dimensional viewing and projection" (3ALITY INC; 14 Sep. 2006);

U.S. Pat. No. 7,705,935 "Stereoscopic display system" (ECRANS POLAIRES INC; 27 Apr. 2010);

U.S. Pat. No. 7,646,537 "High-resolution field sequential autostereoscopic display" (SAMSUNG ELECTRONICS CO LTD; 12 Jan. 2010);

U.S. Pat. No. 6,111,598 "System and method for producing and displaying spectrally-multiplexed images of 3D imagery for use in flicker-free stereoscopic viewing thereof" (REVEO INC; 29 Aug. 2000);

U.S. Pat. No. 5,548,427 "Switchable holographic apparatus" (SHARP K K; 20 Aug. 1996);

US20080303962 "Liquid crystal projector and a method of controlling the same" (SONY CORP; 11 Dec. 2008); and JP9113862 "Stereoscopic video display device" (MITSUBISHI ELECTRIC CORP; 2 May 1997).

The foregoing examples of the related art and limitations related thereto are intended to be illustrative and not exclusive. Other limitations of the related art will become apparent to those of skill in the art upon a reading of the specification and a study of the drawings.

SUMMARY OF THE INVENTION

Aspects of the invention relate to 3D displays. The invention may be embodied in a wide range of ways including: 3D displays (displays may be of any of a variety of types including: televisions, computer displays, media player displays, digital cinema displays, special purpose displays such as virtual reality displays, displays in vehicle simulators, game displays, advertising displays and the like); image processing apparatus for preparing image data for display on a 3D display (the image processing apparatus may be integrated into a display or separate); methods for displaying 3D images and/or preparing image data for display on a 3D display; program products comprising non-transitory computer-readable instructions which, when executed by a data processor cause the data processor to implement methods of the invention; and so on.

According to particular embodiments, a projector system incorporates a locally modulated polarizer which is controllable to produce different polarization states for local regions of projector images. In particular embodiments the polarizer is controllable to direct all of the light for an image to one eye, or a portion of light for an image to both eyes at the same time.

One aspect of the invention relates to methods and apparatus for producing left and right images which have smaller intensity differences between subsequent frames. This can reduce flickering and viewer eye fatigue.

Another aspect of the invention relates to methods and apparatus for reducing unwanted crosstalk between left and right eye viewpoints and increasing image contrast and dynamic range.

Another aspect provides a method for displaying a 3D image. The method comprises receiving left and right image data for the 3D image. The 3D image may comprise a still image or a video frame, for example. The method comprises, from the left and right image data determining first and second subframe images and corresponding first and second eye-control images. The method, in sequence, displays the first and second subframe images and, while displaying each of the subframe images applies the corresponding one of the eye-control images to control a degree to which locations in the subframe image are visible to each of a viewer's eyes.

Another aspect provides a display comprising an input for receiving 3D image data comprising left and right image data for a 3D image an image processing system and driving circuits. The image processing system is configured to, from the left and right image data determine first and second subframe images and corresponding first and second eye-control images. The driving circuits are configured to, in a first subframe interval, control a spatial light modulator to display the first subframe image and apply the first eye-control image to control a degree to which locations in the first subframe image are visible to each of a viewer's eyes; and, in a second subframe interval, control the spatial light modulator to display the second subframe image and apply the second eye-control image to control a degree to which locations in the second subframe image are visible to each of the viewer's eyes.

Another aspect provides a method for displaying 3D images. The method comprises receiving left and right image data for a frame; and based on the image data, determining a first projector subframe image for the left image data and a second projector subframe image for the right image data. Based on the first and second projector subframe images the method determines first and second polarizer states such that differences in intensity between resulting left and right subframe images displayed to a viewer are below a threshold level.

Another aspect provides a display comprising a light source; a first display layer controllable to modulate light emitted by the light source to display an image; and a second display layer incorporating a polarizer controllable to produce different polarization states for local regions of the image.

Another aspect provides a projector system comprising a projector operable to display projector images; a display screen; and a polarizer mounted in a light path between the projector and the display screen, wherein the polarizer is controllable to produce different polarization states for local regions of the projector images.

In addition to the exemplary aspects and embodiments described above, further aspects and embodiments will become apparent by reference to the drawings and by study of the following detailed descriptions.

DESCRIPTION OF THE INVENTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Embodiments of the invention provide a projector system incorporating a locally modulated polarizer. The polarizer is controllable to produce different polarization states for different local regions of projected images. The projector system may be based on any suitable projection display technology such as DLP, LCD, LCoS, LED, laser diode, CRT, or the like.

In some embodiments, the polarizer is a linear polarizer. The linear polarizer is controllable to be in between two orthogonal polarizer states. For example, the orthogonal states may be vertical and horizontal states. The polarization of the linear polarizer can be controlled to be directed in a diagonal direction which allows selected portions of the incident light for a corresponding location in the projected image to be directed to the left and right eyes at the same time (e.g. 50% to each eye). Unlike a conventional 3D projector system which shows all the light to the left eye in a first subframe (left image) and then all the light to the right eye in a second subframe (right image), a projector system according to embodiments of the present invention is capable of showing a portion of light to both left and right eyes during both subframes. The proportion of the light available for viewing by left and right eyes respectively can be varied from location to location by changing the local setting of the polarizer.

By calculating and adjusting local polarization states for each subframe, left and right subframe images can be produced which have smaller intensity differences between subsequent subframes. This can reduce flickering and viewer eye fatigue. A locally modulated polarizer can also reduce unwanted crosstalk between left and right eye viewpoints and increase image contrast and dynamic range.

Figure 3:
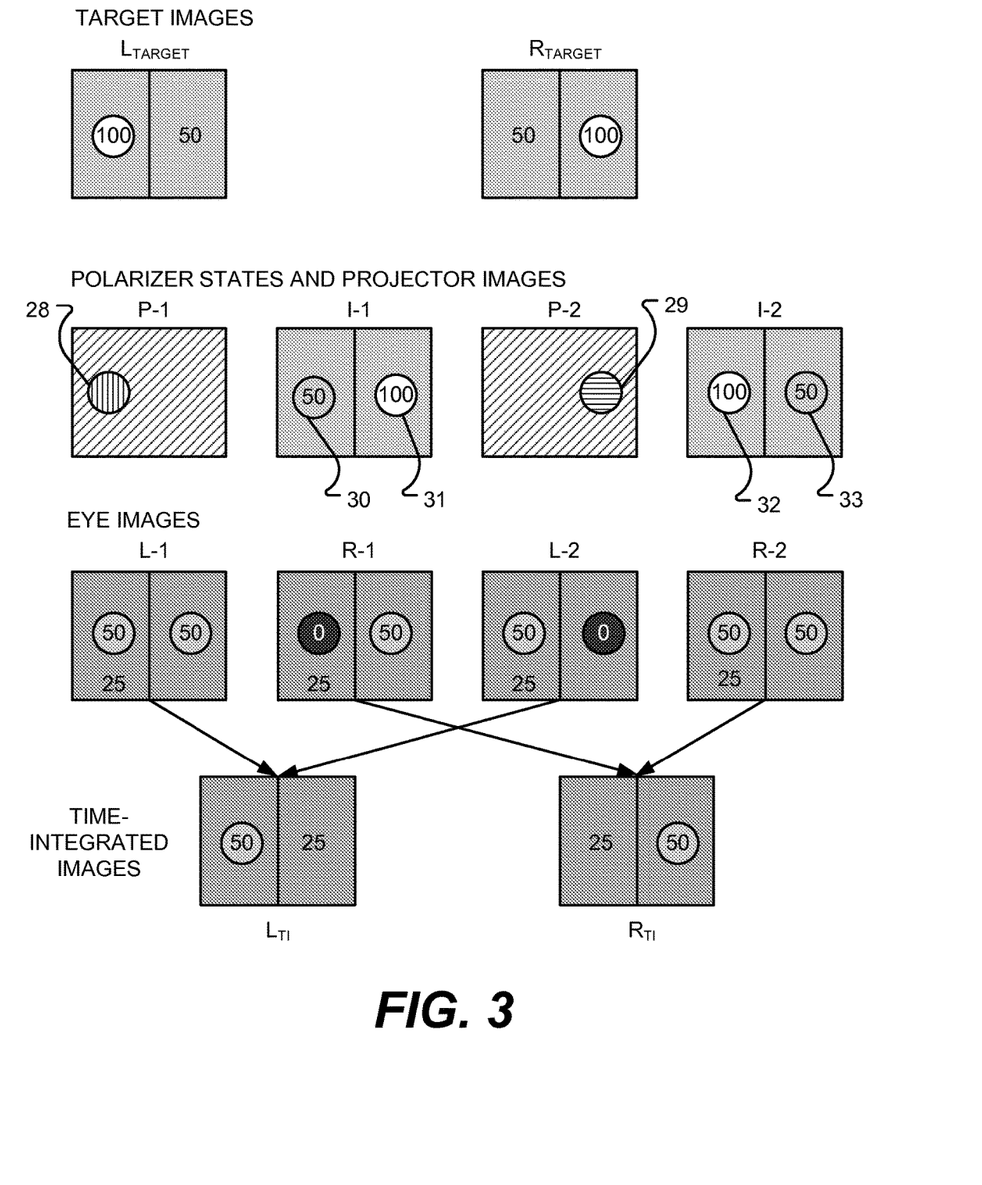
FIG. 3 shows polarizer states and images for a locally modulated polarizer according to one example embodiment.

FIG. 3 shows polarizer states and images for a locally modulated polarizer. For a first subframe, polarizer state P1 and projector subframe image I1 are calculated from target image LTARGET. Polarizer state P1 has a local region 28 which is polarized in a vertical state so that all of the light passing through that region is directed toward the left eye (L1) and the light is blocked from reaching the right eye (R1). The remainder of P1 is polarized diagonally so that in such regions an equal portion of light is directed to the left and right eyes (i.e. 50% to each).

For the first projector subframe image I1, the left circle 30 at 50% intensity is completely transmitted to the left eye (L1) and completely blocked to the right eye (R-1). The right circle 31 at 100% intensity is partially blocked to both eyes, resulting in 50% intensity shown to each eye (see L1, R1). The background at 50% intensity is also partially transmitted to both eyes, resulting in 25% intensity shown to each eye for the background (see L1, R1).

Similar calculations for polarizer state P2 and projector subframe image I2 can be made for the second subframe based on target image RTARGET. Polarizer state P2 has a local region 29 which is polarized in a horizontal state so that all of the light passing through that region is directed toward the right eye (R2) and the light is blocked from reaching the left eye (L2). The remainder of P2 is polarized diagonally so that in such region an equal portion of light is directed to the left and right eyes (i.e. 50% to each). The right circle 33 at 50% intensity is completely transmitted to the right eye (R2) and completely blocked to the left eye (L2). The left circle 32 at 100% intensity is partially blocked to both eyes, resulting in 50% intensity shown to each eye (see L2, R2). The background at 50% intensity is also partially transmitted to both eyes, resulting in 25% intensity shown to each eye for the background (see L2, R2).

When the two subframes are time-integrated by the human visual system, the resulting time-integrated images LTI, RTI seen by the viewer in the FIG. 3 example are the same as those of the FIG. 2 example. However, as can be appreciated by comparing L1 to L2, and R1 to R2 of FIG. 3, there are smaller differences in image intensity between subsequent subframes for each eye, as compared with the FIG. 2 example. The smaller differences in image intensity may reduce flickering and viewer eye fatigue. The smaller differences in image intensity may also reduce unwanted crosstalk between left and right viewpoints.

As shown in FIG. 3, local control of polarization may be applied to allow both eyes to view objects common to both left and right eye views in every subframe while limiting viewing of other depicted objects to one eye.

A variety of techniques may be applied to determine polarizer settings appropriate for displaying a particular 3D image. Consider the case where the image data specifies a left-eye target image LTARGET and a right-eye target image RTARGET. We want to determine subframe images I1 and I2 to be projected and corresponding polarizer states P1 and P2 such that the resulting images presented to the viewer's left and right eyes (L1 to L2, and R1 to R2) result in the time-integrated images perceived by the viewer being respectively essentially the same as left-eye target image LTARGET and a right-eye target image RTARGET.

It can be desirable to minimize differences between L1 and L2 and to minimize differences between R1 and R2 to reduce flicker and improve image accuracy. All driving values should be in range (for example fully off to fully on, 0 to 1). A goal in some embodiments is to have L1 and L2≅LTARGET/2 and to have R1 and R2≅RTARGET/2.

One possible algorithm for setting I1, I2, P1 and P2 based on image data is represented by the following pseudo-code:
(1) Set P1 to LTARGET
(2) Set I1 to RTARGET
(3) Set P2 to (1−RTARGET)
(4) Set I2 to LTARGET
(5) For color images displayed in a time-multiplexed manner, repeat for each color sub-frame.

With this algorithm, the time-integrated left-eye image is given by:

$$\begin{aligned} LTI &= (P1 \times I1 + P2 \times I2) \\ &= (LTARGET \times RTARGET + (1 - RTARGET) \times LTARGET) \\ &= (LTARGET \times RTARGET + LTARGET - \\ &\quad LTARGET \times RTARGET) \\ &= LTARGET. \end{aligned}$$

Similarly, the time-averaged right-eye image is RTI=(1−P1)×I1+(1−P2)×I2)=(I1−P1×I1+I2−P2×I2)=(RTARGET−LTARGET×RTARGET+LTARGET−LTARGET+RTARGET×LTARGET)=RTARGET.

Figure 4:
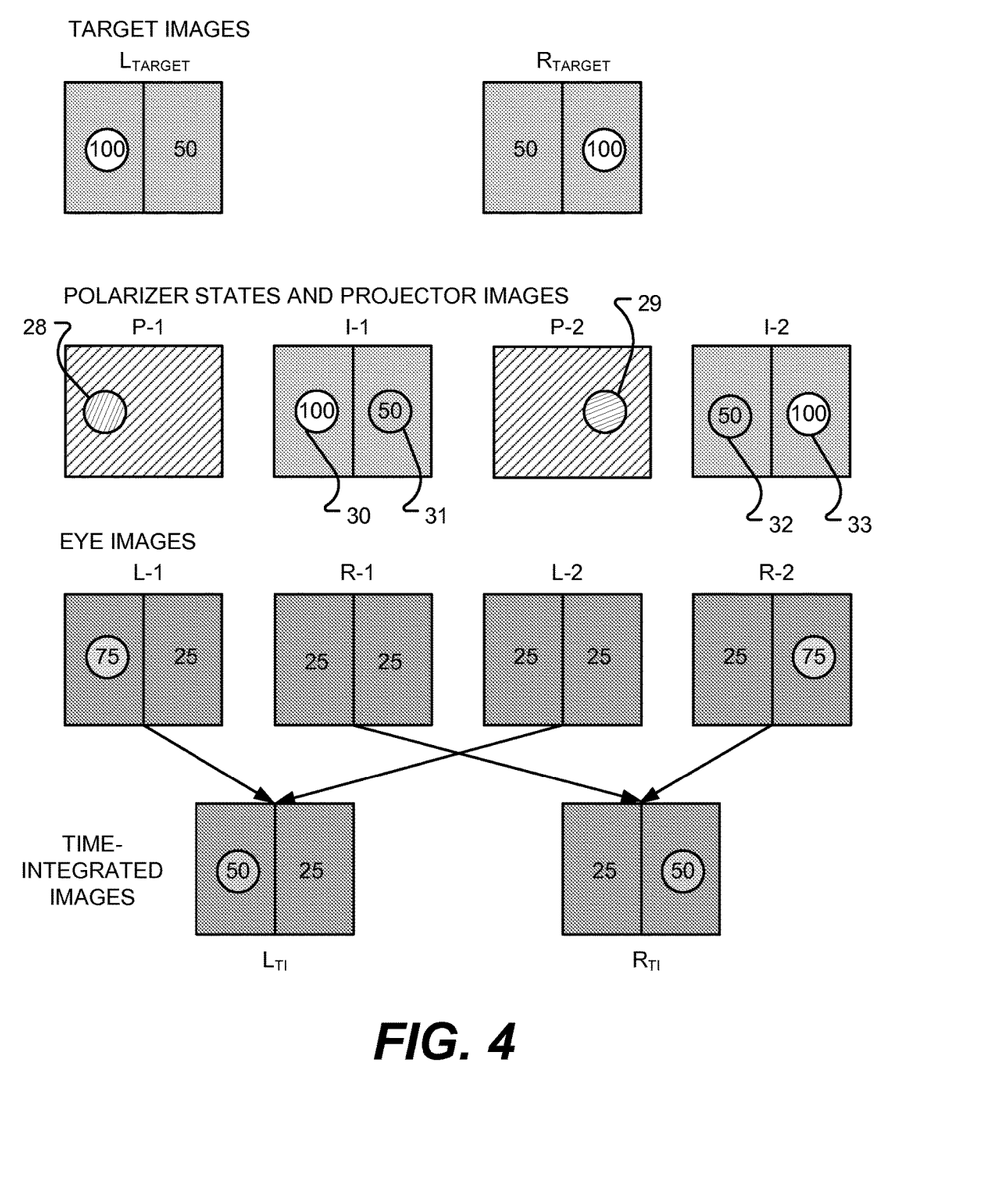
FIG. 4 shows polarizer states and images for a locally modulated polarizer according to another example embodiment.

FIG. 4 shows another example combination of polarizer states and images for a locally modulated polarizer. This combination results in the same time-integrated images LTI, RTI as in the FIG. 3 example.

In the FIG. 4 example, for a first subframe, polarizer state P1 has a local region 28 which is polarized at an angle (67.5°, i.e. 75% of 90°) such that 75% of the light passing through that region is viewable by the left eye (L1) and 25% is viewable by the right eye (R1). The remainder of P1 is polarized diagonally so that in such region an equal portion of light is directed to the left and right eyes (i.e. 50% to each). Polarizer state P2 has a local region 29 which is polarized at another angle (22.5°, i.e. 25% of 90°) such that 75% of the light passing through that region is directed toward the right eye (R2) and 25% is directed to the left eye (L2). The remainder of P2 is polarized diagonally so that in such region an equal portion of light is directed to the left and right eyes (i.e. 50% to each).

When polarizer state P1 is applied to projector subframe image I1, left and right eye subframe images L1, R1 are produced. When polarizer state P2 is applied to projector subframe image I2, left and right eye subframe images L2, R2 are produced. As can be seen by comparing L1 to L2, and R1 to R2 of FIG. 4, this combination results in the same differences in image intensity between subsequent frames for each eye as in the FIG. 3 example.

A difference between the FIG. 3 and FIG. 4 examples is the rotation in polarizer angle. For certain regions the rotation in polarizer angle between subsequent subframes of the FIG. 4 example is smaller than in the FIG. 3 example. In FIG. 4, the polarizer angle of local region 28 moves from 67.5° in polarizer state P1 to 45° in polarizer state P2 (i.e. a difference of 22.5°). The polarizer angle of local region 29 moves to 22.5° in polarizer state P2 from 45° in polarizer state P1 (i.e. a difference of 22.5°. By contrast, in FIG. 3 the polarizer angle of local region 28 moves from 90° in polarizer state P1 to 45° in polarizer state P2 (i.e. a difference of 45°). The polarizer angle of local region 29 moves to 0° in polarizer state P2 from 45° in polarizer state P1 (i.e. a difference of 45°).

Depending on the polarizer technology, the FIG. 3 or FIG. 4 combination may be preferable. For some polarizers, the polarizer switch time is faster (more precise) if the angle of rotation is maximized between subsequent subframes. For other polarizers, the polarizer switch time is faster if the angle of rotation is minimized between subsequent subframes. For yet other polarizers, an angle of rotation which is somewhere between such maximum and minimum angles is desirable. An algorithm for determining a combination of polarizer states and projector images may take into account polarization rotation angles for optimal (faster or more precise) switching between polarization states. This may reduce unwanted crosstalk between left and right viewpoints.

Figure 5:
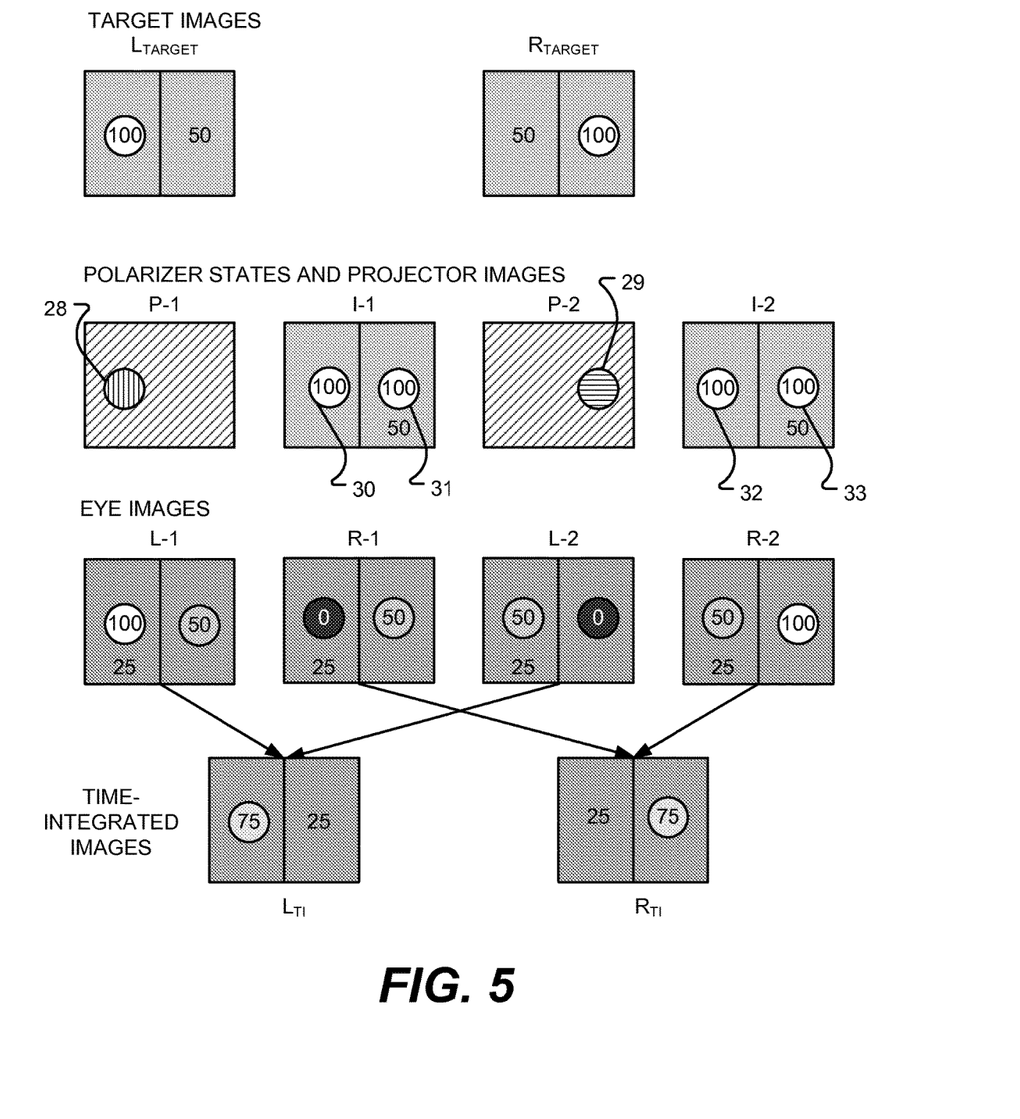
FIG. 5 shows polarizer states and images for a locally modulated polarizer according to another example embodiment.

In some cases, an algorithm for determining a combination of polarizer states and projector images may take into account differences in intensity between subsequent projector subframe images I1, I2. For example, for LCD, LCoS or other display technologies, it may be more efficient to either maximize or minimize the differences in intensity between projector subframe images I1 and I2. The differences in intensity are the same for the FIGS. 3 and 4 examples, but are minimized in the FIG. 5 example which has the same projector subframe images I1, I2. FIG. 5 is described in further detail below.

In addition to the examples shown in FIGS. 3 and 4, other combinations of polarizer states and projector images may be used to produce the same time-integrated left and right images.

Figure 6A:
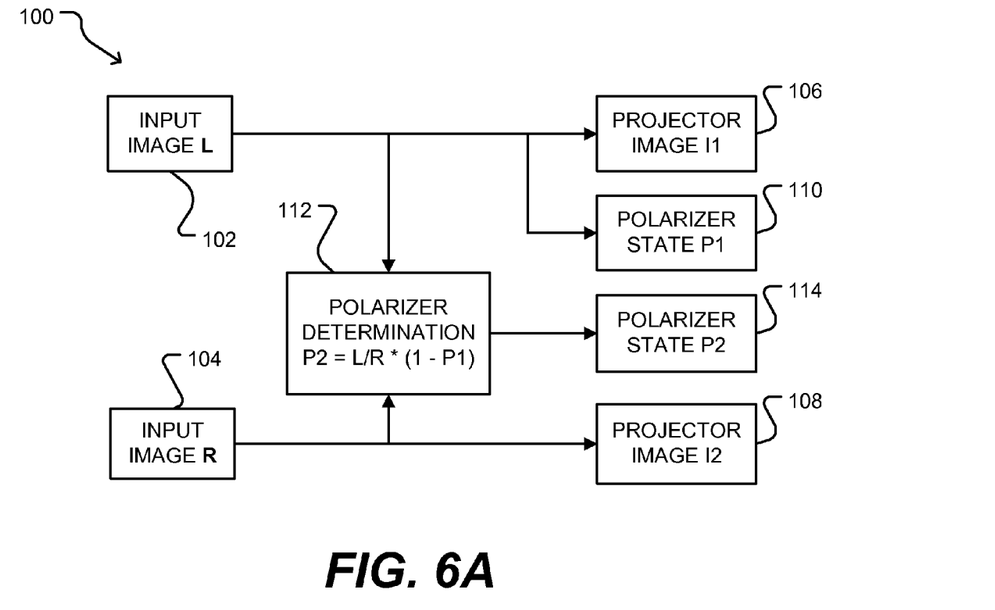
FIGS. 6A and 6B show flowcharts of methods for calculating polarizer states and projector images according to example embodiments.

FIG. 6A shows a flowchart of a method 100 for determining polarizer states and projector images according to one example embodiment. FIG. 6A may be used to calculate polarizer states and projector images for either of the examples of FIGS. 3 and 4.

Method 100 of FIG. 6A begins by receiving left input image data L (block 102) and right input image data R (block 104) for a frame. Such image data may represent target images LTARGET, RTARGET shown in FIGS. 3 and 4, for example. Based on this input image data, a first projector subframe image I1 is determined at block 106 and a second projector subframe image I2 is determined at block 108. At block 110, polarizer states P1 are selected based on projector subframe image I1.

An algorithm (block 112) may be applied to left and right input image data L, R and polarizer state P1 to determine polarizer states P2 at block 114. In the illustrated example, the determination of polarizer state P2 may be represented by the following equation:

$$P2 = L/R \times (1-P1) \quad [1].$$

In some embodiments, polarizer states P1, P2 may be determined on a pixel-by-pixel basis. In other embodiments, each frame of input image data may be divided into regions. In such embodiments, polarizer states P1, P2 may be calculated for each region of the frame.

FIG. 5 shows another example combination of polarizer states and images for a locally modulated polarizer. In this embodiment, the crosstalk between viewpoints (i.e. the degree to which the polarizer is set to allow light to reach both of a viewer's eyes) is selected to produce a higher peak luminance for time-integrated left and right images LTI, RTI. The higher peak luminance can be applied to increase the contrast and dynamic range of the image, or to recover some light lost due to the polarization of light from a projector.

Polarizer states P1, P2 of the FIG. 5 example are the same as those of the FIG. 3 example. However, in the FIG. 5 example, each of projector subframe images I-1 and I2 is a combination of target images LTARGET, RTARGET such that bright regions in each target image appear in both projector subframe images. As shown in FIG. 5, the resulting time-integrated left and right images LTI, RTI have a greater contrast between the bright regions, at 75% intensity, and the background region, at 25% intensity.

The techniques exemplified by FIG. 5 may be applied to increase brightness (or contrast) for image content where there is some light shown to both eyes in the same image regions for subsequent subframes. For example, such techniques would not be useful to increase the brightness for a scene having a bright object appearing to the left eye but which appears as black to the right eye at the same location. The techniques may be useful for power-saving applications.

Figure 6B:
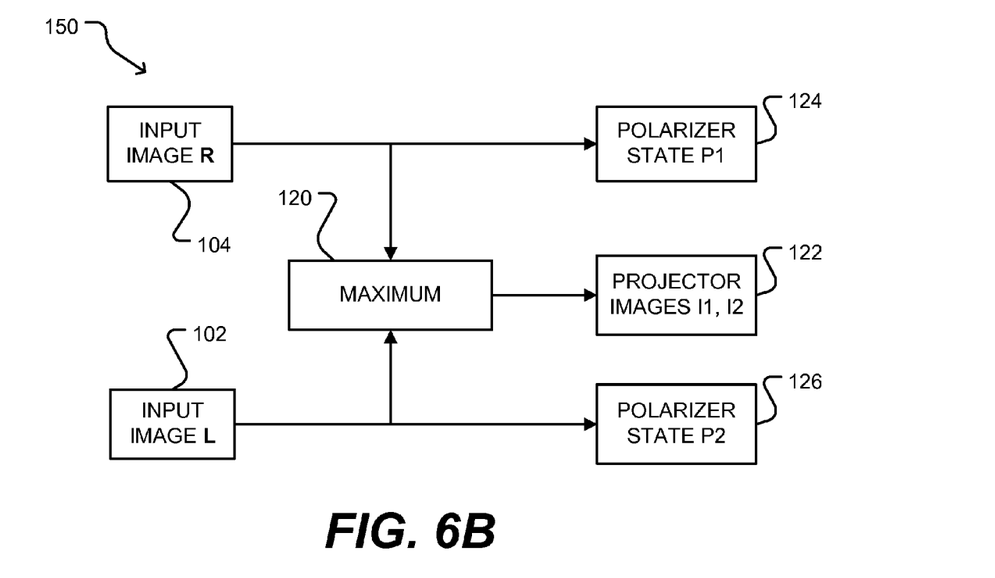

FIG. 6B shows a flowchart of a method 150 for determining polarizer states and projector images to provide time-integrated left and right images having improved contrast, according to one example embodiment. FIG. 6B may be used to calculate polarizer states and projector images for the example of FIG. 5.

Method 150 of FIG. 6B begins by receiving left input image data L (block 102) and right input image data R (block 104) for a frame. Based on this input image data, peak brightness levels are evaluated at block 120 and used to determine first and second projector subframe images I1, I2 at block 122. Based on such projector images I1, I2, polarizer states P1 and P2 are determined at blocks 124, 126, respectively.

Figure 7:
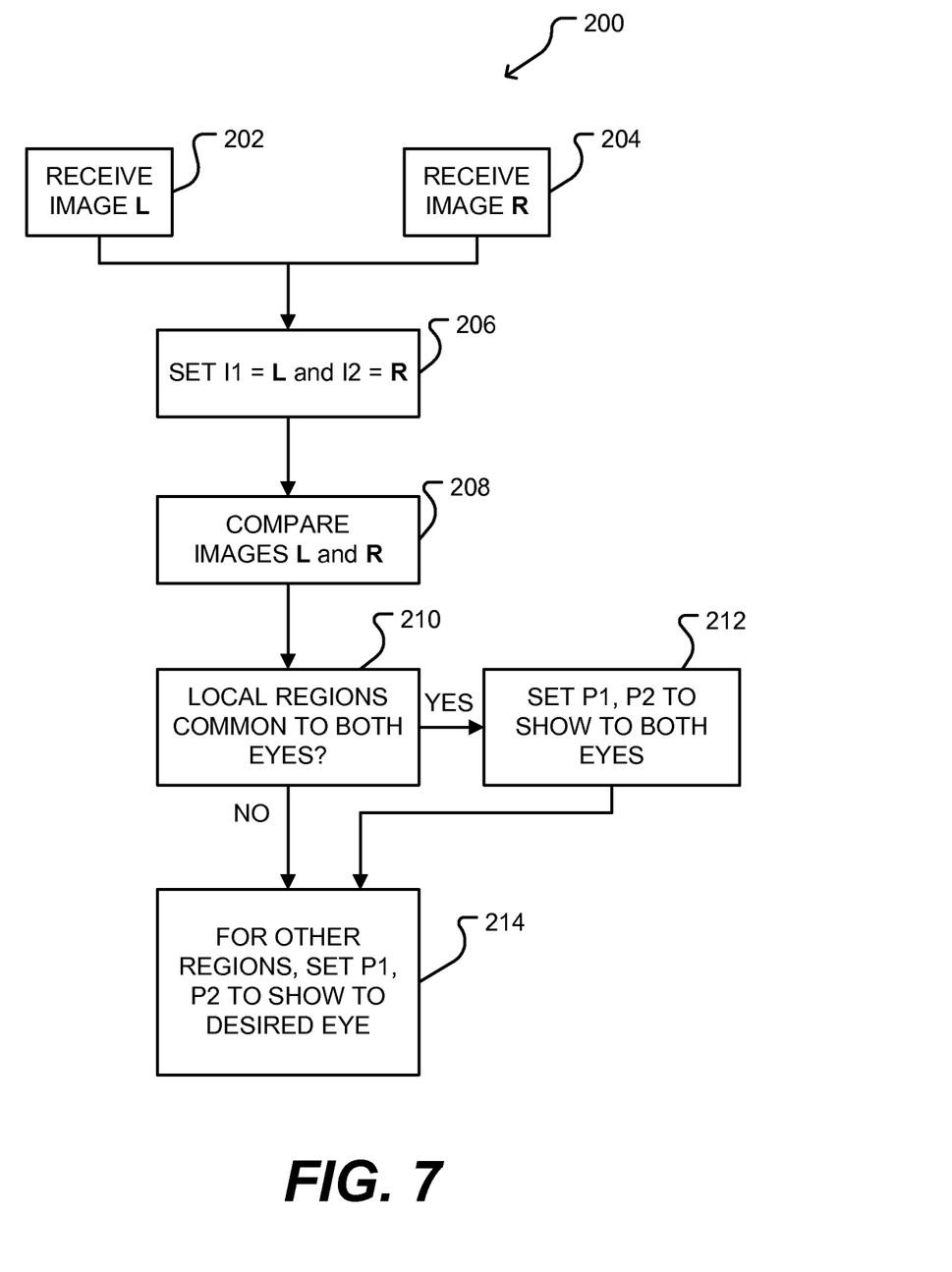
FIG. 7 shows a flowchart of a method for calculating polarizer states and projector images according to one example embodiment.

FIG. 7 shows a flowchart of a method 200 for determining polarizer states and projector images according to another example embodiment. Method 200 begins by receiving left input image L (block 202) and right input image R (block 204) for a frame. Method 200 proceeds to block 206, at which first projector subframe image I1 is set to left input image L and second projector subframe image I2 is set to right input image R (see, for example, target images LTARGET, RTARGET and projector subframe images I1, I2 in FIG. 4). In other embodiments, at block 206, first projector subframe image I1 is set to right input image R and second projector subframe image I2 is set to left input image L (see, for example, target images LTARGET, RTARGET and projector subframe images I1, I2 in FIG. 3).

At block 208, images L and R are compared. For example, differences in image intensity may be compared to determine whether there are any local regions common to both images L and R (i.e. regions which have the same intensity level in images L and R). If there are common local regions (block 210), then at block 212, polarizer states P1, P2 are determined for the common local regions, based on projector subframe images I1, I2, so that such regions appear with the same intensity in each of the left and right subframe images. In some cases, the same polarizer state may be applied in such regions. In any other regions, at block 214 polarizer states P1, P2 are determined, based on projector subframe images I1, I2, so that the desired intensity levels (matching the images in L and R) are shown to each eye. For such regions polarizer states P1, P2 may be different for successive subframes.

In certain cases, it may not be practical to locally modulate the polarizer so as to reduce or minimize the differences in image intensity between subsequent frames. For some image content, it may be more advantageous to revert to a full frame polarizer (i.e. alternating between opposite polarizer states so that a left image is presented to the left eye while a blank screen is presented to the right eye, then a right image is presented to the right eye while a blank screen is presented to the left eye). This may be the case where there are many differences in intensity between the target input left and right images, such as for example, an image of black and white stripes or a black and white checkerboard pattern, which are shifted between the left and right images so that many image pixels alternate between black and white for successive subframes.

In some embodiments, the locally modulated polarizer has at least the same spatial resolution as the projector image. Preferably the locally modulated polarizer has a higher spatial resolution than the projector image. In particular embodiments, the polarizer has at least double the spatial resolution of the projector image. This can ensure that very small features can be accurately directed to the correct left or right viewpoint.

In other embodiments, the locally modulated polarizer has a lower spatial resolution than the projector image. If the polarizer has a lower resolution, the polarizer may be operated as a conventional sequential polarizer (i.e. alternating between opposite polarization states) for regions surrounding features smaller than the polarizer resolution. For regions larger than the polarizer resolution, the polarizer may be operated using the above-described techniques for reducing flicker or increasing contrast.

Embodiments described herein incorporate a linear polarizer. Images displayed by such embodiments may be viewed by observers wearing eyeglasses that incorporate the appropriate linear polarizing filters (e.g. vertical for one eye and horizontal for the other eye). In other embodiments, a circular polarizer may be used. Local regions of the polarizer may be controllable to be in between clockwise and counter-clockwise polarized states. Images displayed by such embodiments may be viewed by observers wearing eyeglasses that have appropriate circular polarizing filters.

Figure 8:
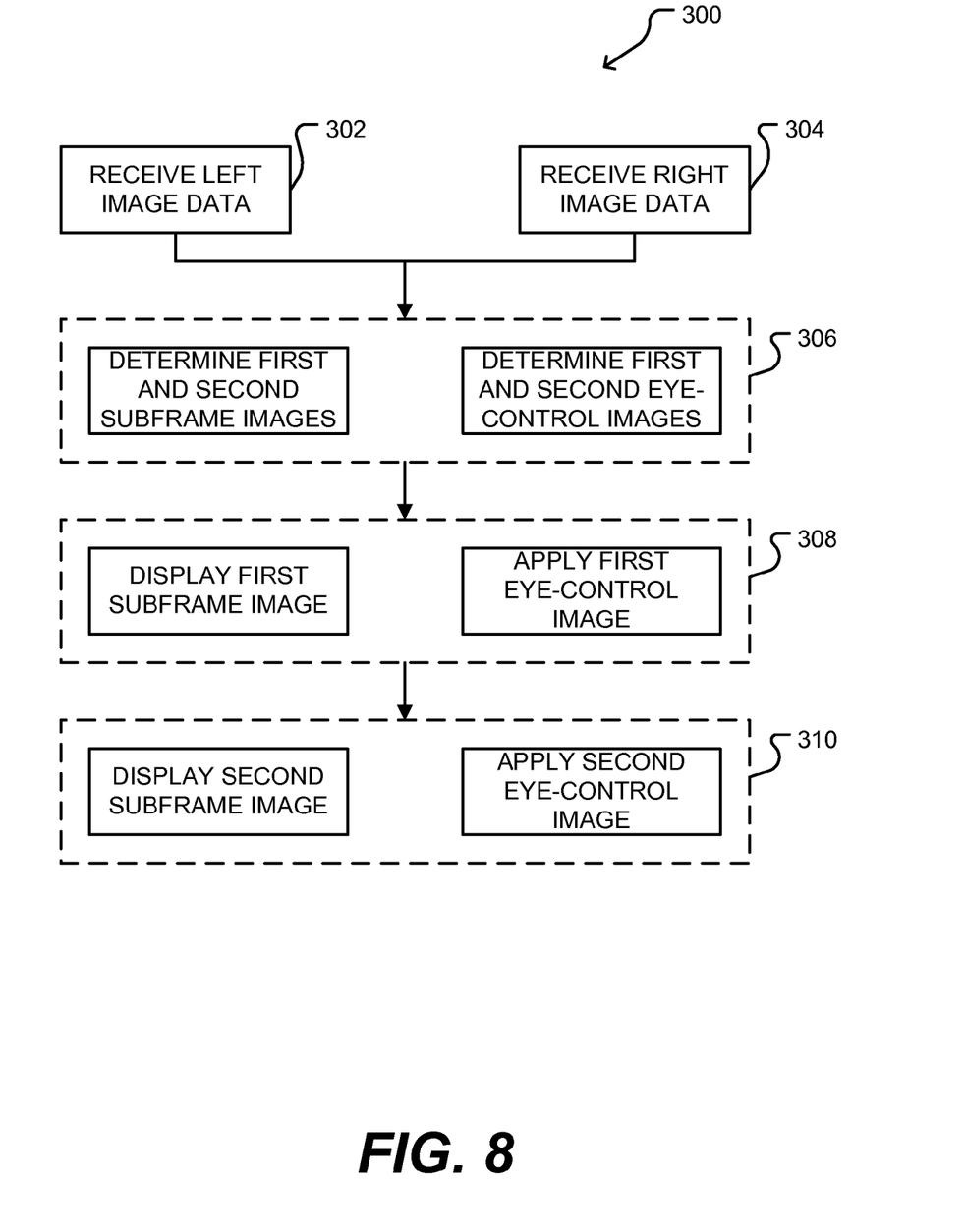
FIG. 8 shows a flowchart of a method for displaying a 3D image according to an example embodiment.

Some of the above-described techniques may be applied to other 3D display technologies (e.g., technologies for delivering stereoscopic images to viewers' eyes other than polarization-based technologies). FIG. 8 shows a flow chart of a method 300 for displaying a 3D image according to an example embodiment. Method 300 may be implemented using polarization-based technologies or other 3D technologies. Method 300 begins by receiving left image data (block 302) and right image data (block 304) for a 3D image. Method 300 proceeds to block 306, at which first and second subframe images and corresponding first and second eye-control images are determined from the left and right image data. In an example implementation of method 300 using polarization-based technology, the first and second frame images comprise projector subframe images (such as projector subframe images I1 and I2, for example), and first and second eye-control images comprise polarizer states (such as polarizer states P1 and P2).

Method 300 proceeds to block 308. In block 308, the first subframe image is displayed, and while the first subframe image is being displayed, the first eye-control image, which corresponds to the first subframe image, is applied to control the degree to which locations in the first subframe image are visible to each of a viewer's eyes. In an example implementation of method 300 using polarization-based technology, block 308 comprises displaying the first projector subframe image and, while displaying the first projector subframe image, applying the first polarizer state to the first projector subframe image to control the degree to which locations in the first subframe image are visible to each of a viewer's eyes (e.g., by polarizing light passing through different regions of a locally controllable polarizer differently).

Method 300 proceeds to block 310. In block 310, the second subframe image is displayed, and while the second subframe image is being displayed, the second eye-control image, which corresponds to the second subframe image, is applied to control the degree to which locations in the second subframe image are visible to each of a viewer's eyes. In an example implementation of method 300 using polarization-based technology, block 310 comprises displaying the second projector subframe image and, while displaying the second projector subframe image, applying the second polarizer state to the second projector subframe image to control the degree to which locations in the second subframe image are visible to each of a viewer's eyes (e.g., by polarizing light passing through different regions of a locally controllable polarizer differently).

Figure 9:
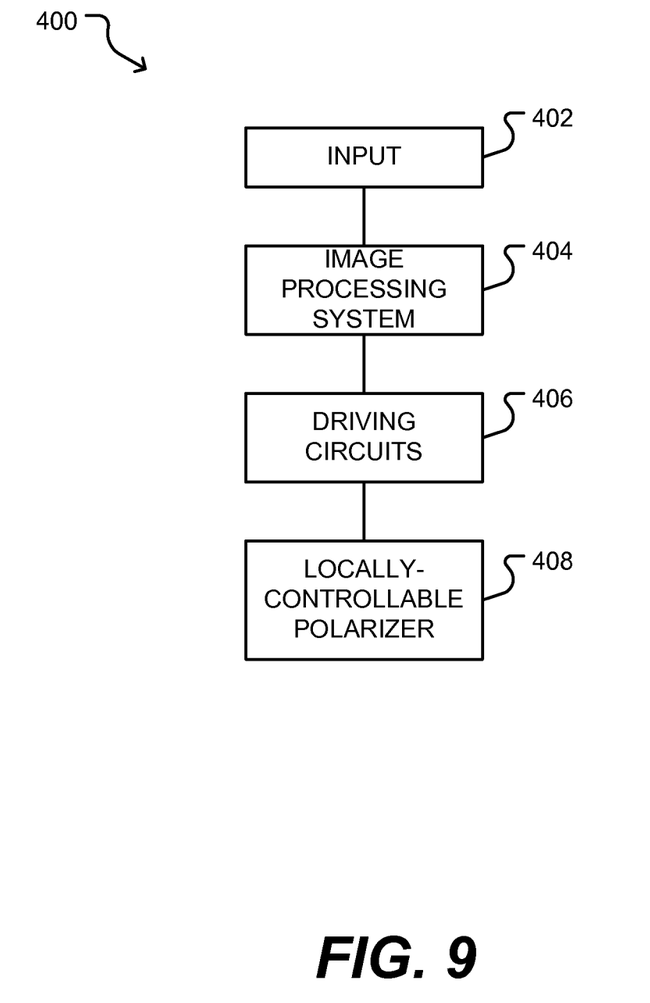
FIG. 9 shows a schematic diagram of a display according to an example embodiment.

FIG. 9 shows a display 400 according to an example embodiment. Display 400 comprises an input 402 for receiving 3D image data comprising left and right image data for a 3D image. Display 400 also comprises an image processing system 404 configured to, from the left and right image data determine first and second subframe images and corresponding first and second eye-control images. Image processing system 404 is coupled to driving circuits 406, which are configured to in a first subframe interval control a spatial light modulator to display the first subframe image and apply the first eye-control image to control a degree to which locations in the first subframe image are visible to each of a viewer's eyes, and in a second subframe interval control the spatial light modulator to display the second subframe image and apply the second eye-control image to control a degree to which locations in the second subframe image are visible to each of the viewer's eyes.

In the illustrated embodiment, display 400 comprises a locally controllable polarizer 408. Driving circuits 406 are configured to drive polarizer 408 according to the first eye-control image in the first subframe interval and to drive polarizer 408 according to the second subframe image in the second subframe interval.

In some embodiments, display 400 comprises a light source (not shown) and a first display layer (not shown) controllable to modulate light emitted by the light source to display an image. Polarizer 408 may be incorporated in a second display layer arranged to have the image displayed thereon, such that polarizer 408 is controllable to produce different polarization states for local regions of the image. Polarizer 408 may be controllable to produce a polarization state which directs a portion of light from the light source to each of the left and right eyes of a viewer at the same time.

Some of the above-described techniques, including for example method 300, may be applied to display technologies based on spectral filtration. In such technologies a projector is operated to provide spectrally filtered light to the viewer so that the left eye is presented with light in a first set of spectral bands (providing a left image) and the right eye is presented with light in a complementary, second set of spectral bands (providing a right image). For example, at time t1 an image comprising spectral bands R1G1B1 may be provided to the left eye, then at time t2 an image comprising spectral bands R2G2B2 may be provided to the right eye. The viewer wears eyeglasses which allow all light from spectral bands R1G1B1 to pass through to the left eye while preventing such light from reaching the right eye, and allow all light from spectral bands R2G2B2 to pass through to the right eye while preventing such light from reaching the left eye.

According to particular embodiments, the backlight may be spatially modulated so that local regions for a subframe image can have different spectral bands (e.g. some regions have light from spectral bands R1G1B1 while others have light from spectral bands R2G2B2). In certain embodiments, in local regions of the image, light from a third set of spectral bands, e.g. R3G3B3, may be presented to the viewer which can be viewed by both eyes at the same time. Left and right images may therefore be displayed for which, for at least some regions, some light from the image reaches both eyes at the same time.

According to other embodiments, polarizer 26 is replaced with a color filter which is controllable to modulate the light spectrum in local regions of each projector subframe image (e.g., to apply an eye-control image to control a local balance between a plurality of sets of narrow-band primary colors). For example, regions of the filtered projector subframe images may have a narrow band spectrum centered on frequency f1 while other regions may have a narrow spectrum centered on frequency f2 or f3, etc. The color filter may incorporate adjustable quantum structures or adjustable diffraction gratings. The observer may wear eyeglasses including spectral filters for observing the left and right images.

According to other embodiments, instead of using a polarizer 26 to adjust the polarization of light sources, the imaging device may illuminate a screen with locally-polarized light to produce subframe images I1, I2. For example, light sources in an imaging device (e.g. the backlight of an LCD display) may incorporate light sources of opposite polarization states, or an imaging device (e.g. a DLP) may incorporate light sources which are controllable to produce different polarization states in local image regions.

Some of the above-described techniques, including for example method 300, may also be applied to 3D display technologies based on eyeglass shuttering. In such technologies a viewer wears eyeglasses including optical shutters that are operated in synchronization with the display to allow only one eye to view the display at a time. The display is operated to show an image for viewing by the viewer's left eye while the left eye shutter is opened and the right eye shutter is closed. Then the left eye shutter is closed and the right eye shutter is opened while the display is operated to display an image for viewing by the viewer's right eye. According to particular embodiments, during a portion of a frame both shutters may be opened at the same time so that an image is presented to both eyes at the same time.

In some embodiments, shutter glasses are configured to apply a plurality of different polarizer states to displayed images to control the degree to which locations in the displayed images are visible to each of a viewer's eyes.

In some embodiments, shutter glasses control the degree to which locations in an image presented to both eyes at the same time are visible to each of a viewer's eyes by controlling the length of time that the locations are visible to each of the viewer's eyes. In some such embodiments, a shutter-glass lens may apply a plurality of different eye-control images in sequence during the time that an image is present to both eyes. For example, a first eye-control image (e.g., a color filter passing two sets of narrow-band primary colors) may be applied to allow light from first and second regions to be visible to one of the viewer's eyes for a first time period, and a second eye-control image (e.g., a color filter passing one of the two sets of narrow-band primary colors) may be applied to allow light from the second region but not the first region to be visible to the one of the viewer's eyes for a second time period.

The apparatus and methods described herein are not limited to projectors. Other types of displays may incorporate a locally modulated polarizer for setting polarization states in local regions of an image. Such displays may include, for example, flat panel displays, such as LCD, plasma, LED, or OLED flat panel displays or the like. A backlit LCD display may incorporate a first display layer controllable to define pixel intensity (e.g. by modulating the intensity of light passing through the pixels), and a second display layer controllable to adjust polarization states in local regions of the image for 3D viewing.

Apparatus, systems, modules and components described herein (including without limitation inputs, image processing systems, and driving circuits) may comprise software, firmware, hardware, or any combination(s) of software, firmware, or hardware suitable for the purposes described herein. Such software, firmware, hardware and combinations thereof may reside on personal computers, set top boxes, media players, video projectors, servers, shutter glasses, displays (such as televisions, computer monitors, and the like) and other devices suitable for the purposes described herein. Furthermore, aspects of the system can be embodied in a special purpose computer or data processor that is specifically programmed, configured, or constructed to perform one or more of the computer-executable instructions explained in detail herein.

Image processing and processing steps (including without limitation steps directed to determining polarizer states and other eye-control images) as described above may be performed in hardware, software or suitable combinations of hardware and software. For example, such image processing may be performed by a data processor (such as one or more microprocessors, graphics processors, digital signal processors or the like) executing software and/or firmware instructions which cause the data processor to implement methods as described herein. Such methods may also be performed by logic circuits which may be hard configured or configurable (such as, for example logic circuits provided by a field-programmable gate array "FPGA"). Image processing and processing steps as described above may operate on and/or produce image data (including without limitation polarizer states and other eye control images) embodied in computer-readable signals carried on non-transitory media.

Certain implementations of the invention comprise computer processors which execute software instructions which cause the processors to perform a method of the invention. For example, one or more processors in a display, personal computer, set top box, media player, video projector, server, shutter glasses, or the like may implement methods as described herein by executing software instructions in a program memory accessible to the processors.

Some aspects of the invention may also be provided in the form of a program product. The program product may comprise any non-transitory medium which carries a set of computer-readable signals comprising instructions which, when executed by a data processor, cause the data processor to execute a method of the invention. For example, such a program product may comprise instructions which cause a data processor in a display to adjust the image data for display on the display. Program products according to the invention may be in any of a wide variety of forms. The program product may comprise, for example, media such as magnetic data storage media including floppy diskettes, hard disk drives, optical data storage media including CD ROMs, DVDs, electronic data storage media including ROMs, flash RAM, hardwired or preprogrammed chips (e.g., EEPROM semiconductor chips), nano-technology memory, or the like. The computer-readable signals on the program product may optionally be compressed or encrypted. Computer instructions, data structures, and other data used in the practice of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

The technology provided herein can be applied to other systems, not necessarily the system described above. The elements and acts of the various examples described above can be combined to provide further examples. Aspects of the system can be modified, if necessary, to employ the systems, functions, and concepts of the various references described above to provide yet further examples of the technology.

Where a component (e.g. a polarizer, filter, projector, display, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments.

These and other changes can be made to the system in light of the above Description. While the above description describes certain examples of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Description section explicitly and restrictively defines such terms. Accordingly, the actual scope of the system encompasses not only the disclosed examples, but also all equivalent ways of practicing or implementing the technology under the claims.

From the foregoing, it will be appreciated that specific examples of systems and methods have been described herein for purposes of illustration, but that various modifications, alterations, additions and permutations may be made without deviating from the spirit and scope of the invention. The embodiments described herein are only examples. Those skilled in the art will appreciate that certain features of embodiments described herein may be used in combination with features of other embodiments described herein, and that embodiments described herein may be practiced or implemented without all of the features ascribed to them herein. Such variations on described embodiments that would be apparent to the skilled addressee, including variations comprising mixing and matching of features from different embodiments, are within the scope of this invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for displaying a 3D image, the method comprising:
   receiving left and right image data for the image;
   from the left and right image data determining first and second subframe images and corresponding first and second eye-control images;
   in a first subframe interval, displaying the first subframe image and applying the first eye-control image to control a degree to which locations in the first subframe image are visible to each of a viewer's eyes;
   in a second subframe interval, displaying the second subframe image and applying the second eye-control image to control a degree to which locations in the second subframe image are visible to each of the viewer's eyes;
   wherein a locally-controllable polarizer is driven according to the first eye-control image in the first subframe interval and according to the second subframe image in the second subframe interval;
   wherein the polarizer comprises a plurality of regions each comprising a linear polarizer controllable to polarize light with a polarization in a range extending from a first polarizer state to a second polarizer state orthogonal to the first polarizer state;
   wherein the plurality of regions comprises (a) a first region set, based on the first eye-control image, to a first polarization in the first subframe interval and (b) a second region set, based on the first eye-control image, to a second polarization in the first subframe interval; and wherein the first polarization is different from the second polarization.

2. A method according to claim 1 wherein applying the first eye-control image to control a degree to which locations in the first subframe image are visible to each of a viewer's eyes comprises applying the first eye-control image to control a local balance between a plurality of sets of narrow-band primary colors.

3. A method according to claim 1 wherein differences between the intensities of first and second subframe images are smaller than differences between the intensities of left and right image data.

4. A method according to claim 1 wherein the first eye-control image comprises at least some values specifying that corresponding areas of the first subframe image are to be equally visible to both of the viewer's eyes and at least some other values specifying that corresponding areas of the first subframe image are to be more visible to one of the viewer's eyes than to the other of the viewer's eyes.

5. A method according to claim 1 wherein the eye-control images have a higher spatial resolution than the subframe images.

6. A method according to claim 5 wherein the spatial resolution of the eye-control images is at least twice that of the subframe images.

7. A display comprising:
an input for receiving 3D image data comprising left and right image data for a 3D image;
an image processing system configured to, from the left and right image data determine first and second subframe images and corresponding first and second eye-control images;
one or more driving circuits configured to:
 in a first subframe interval control a spatial light modulator to display the first subframe image and apply the first eye-control image to control a degree to which locations in the first subframe image are visible to each of a viewer's eyes; and
 in a second subframe interval control the spatial light modulator to display the second subframe image and apply the second eye-control image to control a degree to which locations in the second subframe image are visible to each of the viewer's eyes;
a locally-controllable polarizer wherein the driving circuits are configured to drive the polarizer according to the first eye-control image in the first subframe interval and to drive the polarizer according to the second subframe image in the second subframe interval;
wherein the polarizer comprises a plurality of regions each comprising a linear polarizer controllable to polarize light with a polarization in a range extending from a first polarizer state to a second polarizer state orthogonal to the first polarizer state;
wherein the plurality of regions comprises (a) a first region set, based on the first eye-control image, to a first polarization in the first subframe interval and (b) a second region set, based on the first eye-control image, to a second polarization in the first subframe interval; and wherein the first polarization is different from the second polarization.

8. A display according to claim 7 wherein the polarizer has a resolution exceeding that of the spatial light modulator.

9. A display according to claim 8 wherein the polarizer has a resolution at least twice that of the spatial light modulator.

10. A display according to claim 7 wherein the polarizer has a resolution less than that of the spatial light modulator.

* * * * *